United States Patent [19]

Calcagno et al.

[11] 4,005,175

[45] Jan. 25, 1977

[54] PROCESS FOR THE JOINT PRODUCTION OF SODIUM TRIPOLYPHOSPHATE AND TITANIUM DIOXIDE

[75] Inventors: Benedetto Calcagno; Luigi Piccolo; Antonio Paolinelli; Giorgio Cozza, all of Milan; Gabriele Bottai, Varese, all of Italy

[73] Assignee: Societa' Italiana Resine S.I.R. S.p.A., Milan, Italy

[22] Filed: Mar. 21, 1975

[21] Appl. No.: 560,750

[30] Foreign Application Priority Data

Mar. 25, 1974 Italy .................................. 67939/74

[52] U.S. Cl. .................................. 423/83; 423/315; 423/544; 423/558; 423/615

[51] Int. Cl.² .................. C01G 23/04; C01B 25/30

[58] Field of Search ............ 423/315, 83, 615, 558, 423/544

[56] References Cited

UNITED STATES PATENTS

| 1,648,146 | 11/1927 | Pevere et al. ................... 423/315 X |
|---|---|---|
| 2,098,056 | 11/1937 | McBerty ........................... 423/83 X |
| 2,109,917 | 3/1938 | Dunn ................................ 423/83 X |
| 2,298,032 | 10/1942 | Bousquet et al. ................ 423/83 X |
| 2,413,640 | 12/1946 | McAdam ......................... 423/83 X |
| 3,129,057 | 4/1964 | Germain ........................... 423/315 |
| 3,169,046 | 2/1965 | Nespital .............................. 423/83 |
| 3,533,742 | 10/1970 | Oster .................................. 423/83 |
| 3,661,513 | 5/1972 | Barker ........................... 423/315 X |
| 3,752,879 | 8/1973 | Cozza et al. ....................... 423/315 |

FOREIGN PATENTS OR APPLICATIONS 1,567,632   4/1970   Germany ........................... 423/315

*Primary Examiner*—Edward Stern
*Attorney, Agent, or Firm*—Sughrue, Rothwell, Mion, Zinn & Macpeak

[57] ABSTRACT

A process for the joint production of titanium dioxide and sodium tripolyphosphate from ores of titanium and phosphorus, and from sulphuric acid, in which the titanium dioxide is produced by the "sulphate process" and the impure dilute aqueous solution of sulphuric acid resulting therefrom is concentrated and used in the initial attack of phosphatic ones to provide a solution containing vanadium and chromium which can be removed without requiring any preventive conversion. The resulting sodium phosphate is then converted to sodium tripolyphosphate in a known way.

7 Claims, No Drawings

PROCESS FOR THE JOINT PRODUCTION OF SODIUM TRIPOLYPHOSPHATE AND TITANIUM DIOXIDE

The present invention relates to a process for the joint production of sodium tripolyphosphate and titanium dioxide, and particularly to such a process based on phosphatic ores, titaniferous material and sulphuric acid.

Titanium dioxide is widely produced on an industrial scale by means of the so-called "sulphate process", in which a titaniferous material, such as ilmenite or a tetaniferous slag, is treated at high temperatures with concentrated sulphuric acid to form a product which is dissolved in water or weak acid to yield a solution of titanium and iron sulphates.

The ferric sulphate present in this solution is subsequently transformed into ferrous sulphate by the addition to the solution of a reducing agent, normally iron filings. The ferrous sulphate is then separated out by precipitation in its heptahydrate form ($FeSO_4.7H_2O$) upon cooling of the solution.

The residual solution, after concentration, is hydrolysed, normally by means of dilution with water at high temperatures, to convert the soluble titanium sulphate to insoluble hydrated $TiO_2$.

After precipitation of the hydrate the latter is filtered, washed and subjected to calcination to give the final titanium dioxide.

One of the greatest inconveniences of the "sulphate process" described above lies in the fact that, in addition to titanium dioxide, large quantities of waste material are also formed, mainly ferrous sulphate heptahydrate and the dilute solutions of sulphuric acid resulting from the hydrolysis stage. Given the lack of possibilities of utilising such waste materials, particularly considering their high content of impurities, and given the fact that their direct disposal causes pollution that effects considerable modification of the natural environment and very great damage to both animal and vegetable life, it is becoming more important to devise a method of converting them into products which do not have the disadvantages described above.

Obviously the best solution to the problem would be one which made it possible to convert the waste materials into useful products, preferably products whose value would at least cover the cost of such conversion. Our earlier Italian Patents Nos. 857,062, 880,264 and 913,054 are all directed to such solution of this problem and relate specifically to processes for the conversion of ferrous sulphate heptahydrate which is derived in the production of titanium dioxide from ilmenites or titaniferous slages via sulphate, to useful products.

In two of our other Italian Patent Applications (Application 21320 - A/73 dated 8.3.1973 and Application 29397 -A/73 dated 26.9.1973) two processes are described by which it is possible to convert the ferrous sulphate which is obtained as a by-product in the production of titanium dioxide from ilmenites or titaniferous slags via sulphate, into other useful products, these consisting in the main of compositions which may be used in agriculture as soil modifiers or as fertilizers.

One problem, however, which has not yet met with a satisfactory solution is that of the dilute aqueous solutions of sulphuric acid, very rich in impurities, which are obtained in the hydrolosis stage of the abovementioned "sulphate process". Very frequently these solutions are discharged directly, sometimes after a limited treatment which reduces but does not eliminate the pollution caused thereby, thus still causing grave ecological damage through their high acidity and toxicity.

Attempts have been made to re-use these dilute aqueous solutions of sulphuric acid in the production cycle for producing titanium dioxide by recovering them after suitable purification and concentration treatments; such processes, however, have proved uneconomic. Moreover the use of such reclaimed acid deleteriously effects the optic characteristics of pigments made using the titanium dioxide produced thereby. These processes have also been modified to involve partial recoveries, which do not prevent direct disposals, but even so this remains a source of not inconsiderable ecological damage.

It has now been found that dilute aqueous solutions of sulphuric acid, rich in impurities, deriving from the hydrolysis stage in the sulphate process for the production of titanium dioxide, produce surprisingly good results when, after suitable concentration, they are utilized in the attack of phosphatic minerals in the production process of phosphoric acid for use in making sodium tripolyphosphate.

The preparation of phosphoric acid from phosphatic minerals is already known. In this technique the phosphatic minerals, in pulverized form, are made to react with sulphuric acid until they dissolve and form phosphoric acid and calcium sulphate dihydrate (gypsum), which latter is precipitated jointly with the fluorine and the silica which are present; these last-mentioned are normally precipitated as sodium fluosilicate. The phosphoric acid thus obtained is very impure, having appreciable quantities of a large number of compounds, and must necessarily be purified, especially when it is desired to obtain it with the characteristics required for use in the preparation of tripolyphosphate adapted for employment in detergent formulations.

One of the characteristics of tripolyphosphate, of fundamental importance for use in detergent formulations, is its degree of whiteness, which must be very high. However, the presence of iron, chromium and above all vanadium compounds as impurities in the phosphoric acid used in its production imparts a yellowish hue to the tripolyphosphate, which becomes increasingly pronounced with larger amounts of such impurities in the phosphoric acid and thence in the tripolyphosphate itself. Therefore the phosphoric acid produced by this technique must be subjected, prior to its use in the preparation of tripolyphosphate, to a series of purification treatments, in particular to remove the vanadium compounds; this, however, is both difficult and economically burdensome.

Such treatments are very complex because the compounds to be removed require a preventive chemical conversion to an easily precipitable form and such chemical conversion is completed only with difficulty. Moreover, even after the required conversions, the precipitations are not always easily achieved either because of the difficulty of achieving a complete result, or because of the form of the precipitate itself, which can be difficult to separate.

The present invention provides a process in which the dilute acqueous solutions of sulphuric acid, obtained in the hydrolysis stage of the sulphate process for the preparation of titanium dioxide, are used, in the preparation of phosphoric acid, for the attack of phosphatic minerals to give impure phosphoric acid in which the iron, chromium and particularly the vanadium impurities are present in an easily precipitable form without the need for preventive chemical conversions. Moreover, precipitation of these impurities takes place in a complete manner and the precipitate is in such a form that it can be separated easily. Phosphoric acid thus obtained, in addition to normal uses, is particularly suited to the production of sodium tripolyphosphate for use in detergent formulations. Such a result is particularly surprising in that the sulphuric acid employed in the attack of phosphatic minerals is particularly rich in impurities.

According to the present invention, a process for the joint production of titanium dioxide and sodium tripolyphosphate from ores of titanium and phosphorus, and from sulphuric acid, is characterized by:

contacting, at elevated temperature, ilmenite or titanium-bearings slags with concentrated sulphuric acid, to form a solid product which is subsequently dissolved in water or weak acid to yield a solution of sulphates of titanium and iron;

converting entirely the iron sulphates to their reduced, ferrous form by reducing the ferric iron present to ferrous iron, and clarifying the resulting solution;

separating the ferrous sulphate in the form of ferrous sulphate heptahydrate;

subjecting to hydrolysis the solution from which the ferrous sulphate heptahydrate has been separated, so that the titanium dioxide is precipitated in a hydrated form;

converting the precipitated hydrated titanium dioxide to pigments of rutile or anatase;

concentrating the aqueous solution of sulphuric acid resulting from the separation of hydrated titanium dioxide, to a concentration not exceeding 70% by weight;

contacting this concentrated solution of sulphuric acid at elevated temperature with phosphatic ores, the quantity of concentrated solution of sulphuric acid being in excess of the stoichiometric quantity necessary to liberate phosphoric acid;

separating fluorine and silica from the solution resulting from the acid attack of the phosphatic ores, and purifying the solution from sulphate ions, free sulphuric acid, arsenic and organic substances present;

separating vanadium, chromium and iron by the addition of sodium hydroxide in an amount sufficient also to cause salification of the phosphoric acid; and converting the sodium phosphates to sodium tripolyphosphate.

The starting materials for the process of the present invention are ilmenites of titaniferous slags which are rich in titanium and iron oxides, but which also contain compounds of magnesium, calcium, aluminium, vanadium, manganese, silicon, chromium and others.

A typical composition for ilmenite is as follows:

| | | |
|---|---|---|
| $TiO_2$ | 54.20% | by weight |
| $Fe_2O_3$ | 17.80% | by weight |
| FeO | 22.60% | by weight |
| $Al_2O_3$ | 1.10% | by weight |
| $Cr_2O_3$ | 0.05% | by weight |
| $V_2O_5$ | 0.15% | by weight |
| $SiO_2$ | 0.30% | by weight |
| CaO | 0.05% | by weight |
| MgO | 0.05% | by weight |
| MnO | 1.50% | by weight |
| Others | 2.20% | by weight |

After drying and grinding the ilmenite or titaniferous slag to be used in the process of the invention these are contacted with commercial sulphuric acid having a concentration equal to about 98% by weight, the ratio of the amount of acid to that of ilmenite being regulated in such a way that it lies in the range from 1.4 to 2 in proportion to the $TiO_2$ content of the ore; the reaction is primed by the addition of water or very dilute sulphuric acid, in such a quantity as to bring the acid concentration to a value in the range between 80% and 86% by weight.

At the end of the reaction a porous solid is obtained, this is dissolved with water or dilute sulphuric acid to bring the titanium dioxide concentration in the solution to the order of 100–140 grams/litre.

The next step in the process is the reduction of the ferric iron present in the dilution slurry to ferrous iron, this being achieved normally by the addition to the slurry of metallic iron in the form of scrap of filings, at a temperature of the order of 50°–80° C. The solution thus obtained is separated by decanting or filtering from the solid residue, possibly after addition of a clarification agent having the purpose of gathering, coagulating and depositing the very fine particles of the dispersed solid residues. The clarified solution is then cooled to a temperature of the order of 10°–20° C thus to precipitate the iron in the form of ferrous sulphate heptahydrate, which is then separated.

The residual solution is then concentrated for example by evaporation at reduced pressure, to a titanium dioxide content of at least 200 grams/litre, and preferably between 210 and 250 g/l. The concentrated solution is then subjected to hydrolysis. The hydrolysis may be carried out either by the Blumenfeld autonucleation technique, or by the technique that involves the addition of germination nuclei to the hydrolysis medium. In either case titanium dioxide hydrate is precipitated, separated from the solution and subjected to treatment to transform it to titanium dioxide in rutile or anatase form. Both forms may be subjected to post-treatments, for example aluminium and silicon oxide precipitation on the particles, to obtain products adapted for use as pigments.

The solution remaining after separation of the titanium dioxide in hydrate form by hydrolysis, contains free sulphuric acid as well as that salified with titanium, iron, aluminium, chromium, vanadium, calcium, magnesium and manganese.

A typical composition of such a solution is as follows:

| | | |
|---|---|---|
| $H_2SO_4$(free) | 20.5% | by weight |
| $TiO_2$ | 0.9% | by weight |
| FeO | 5.1% | by weight |
| $Al_2O_3$ | 0.2% | by weight |
| $Cr_2O_3$ | 0.004% | by weight |
| $V_2O_5$ | 0.07% | by weight |
| CaO | 0.04% | by weight |
| MgO | 0.05% | by weight |
| MnO | 0.5% | by weight |

This solution, in the process of the present invention, is then concentrated up to a maximum strength, in free sulphuric acid, of about 70%, but not below 40% by weight.

The concentration may be achieved by water evaporation and/or by the addition of concentrated commercial sulphuric acid. It is not necessary to exceed a strength equal to about 70% because such a concentration is sufficient for use in the phosphorite attack in the process of the present invention. Conversely, the concentration must be at least 40% as it could not otherwise be used for this purpose.

A typical composition of a solution in which the sulphuric acid is concentrated to 55% by weight, a concentration at which the solubility of the ferrous sulphate diminishes considerably, which is obtained by concentration of the solution having the composition described above, in which the free sulphuric acid is present at a concentration of 20% by weight, is as follows:

| $H_2SO_4$ (free) | 55.0% | by weight |
|---|---|---|
| $TiO_2$ | 0.6% | by weight |
| FeO | 1.4% | by weight |
| $Al_2O_3$ | 0.4% | by weight |
| $Cr_2O_3$ | 0.005% | by weight |
| $V_2O_5$ | 0.12% | by weight |
| CaO | 0.029% | by weight |
| MgO | 0.1% | by weight |
| MnO | 0.2% | by weight |

The concentrated sulphuric acid solution is then contacted at an elevated temperature with phosphatic minerals, generally finely ground phosphorites, the quantity of the solution being in excess by 1–2% of the stoichiometric quantity necessary to free the phosphoric acid. The phosphorites used include, as well as compounds of phosphorus and calcium, compounds of other elements such as iron, aluminium, silicon, fluorine, arsenic and others.

A typical composition for the phosphorites is as follows:

| $P_2O_5$ | 32.0% | by weight |
|---|---|---|
| CaO | 49.50% | by weight |
| $Fe_2O_3$ | 0.65% | by weight |
| $Al_2O_3$ | 0.5% | by weight |
| $SiO_2$ | 2.8% | by weight |
| F | 3.7% | by weight |
| V | 0.015% | by weight |
| As | 10 ppm | |

The remainder being composed of $CO_2$, $SO_3$, sodium oxides, potassium, etc.

The contacting of the hot acid with the phosphatic minerals can be effected using known techniques.

The requirement for an excess of sulphuric acid is due to the fact that, in these conditions, the calcium ions are present in only a small quantity in the phosphoric solution. The attack of the phosphatic ores may advantageously be effected in two stages. In the first stage the ore is contacted with the acid at a concentration of about 40% by weight at a temperature in the range 70° to 90° C for a period of from 4 to 10 hours. The solution is then filtered, the residue is washed with water, and the washing water is added to the solution of phosphoric acid obtained by filtration. In the second stage to the solution resulting from the first stage is added phosphatic ore in a quantity substantially equal to that used in the first stage sulphuric acid at about 70% by weight is also added and the resulting solution is heated to a temperature of from 70° to 90° C for a period of between 4 and 10 hours. The resulting suspension is then filtered. The filtrate obtained is a solution of crude phosphoric acid which requires purifying and usually includes compounds of calcium, fluorine, silicon, vanadium, iron, magnesium, aluminium, titanium, arsenic, traces of chromium, and organic substances, as well as free and salified sulphuric acid.

A typical composition of the crude solution obtained from the phosphorites and sulphuric acid of the compositions described above is as follows:

| $P_2O_5$ | 22.9% | by weight |
|---|---|---|
| $H_2SO_4$ (free) | 4.9% | by weight |
| $H_2SO_4$ (total) | 6.7% | by weight |
| V | 0.08% | by weight |
| F | 1.8% | by weight |
| Fe | 0.7% | by weight |
| Mg | 0.05% | by weight |
| Al | 0.3% | by weight |
| Ti | 0.2% | by weight |
| Si | 0.45% | by weight |
| Cr | ppm 40 | |
| As | ppm 9 | |
| traces of organic substances. | | |

Such a solution, as already mentioned, does not require any preventive treatment for the vanadium, iron and chromium, contrary to the situation in the known technique where commercial sulphuric acid is employed in the phosphorite attack.

The separation of the other impurities present can be effected using known techniques. For example, the free and salified sulphuric acid present may be removed by the addition of barium carbonate, thereby forming barium sulphate which precipitates.

Similarly the fluorine and the silica may be eliminated as sodium fluosilicate by the addition of sodium hydroxide and possible diatomaceous earth in sufficient quantity as to render possible the complete conversion of the fluorine to fluosilicic acid.

The preferred method for the elimination of the free and salified sulphuric acid, the fluorine and the silica is that described in our U.S. Pat. No. 3,607,016. In this method the sulphuric acid present is separated by precipitation in calcium sulphate form by adding to the solution finely pulverized phosphorites in stoichiometric relation to the sulphuric acid. In order to facilitate the precipitation of the calcium sulphate a certain quantity is added of recycled crystals of calcium sulphate. The precipitation is carried out at a temperature in the range of 50° to 80° C, preferably from 60° to 70° C, adding a quantity of calcium sulphate crystals from 2 to 8% by weight of solution. The best results are obtained with percentages of calcium sulphate of from 3 to 5% by weight. The suspension thus obtained is agitated and then cooled by leaving the precipitate to mature for a variable period of from 1 to 5 hours, with the temperature in the range of 20° to 40° C.

Once the precipitation is terminated the liquid is separated from the solid phase by one of the usual procedures (filtration, decantation, centrifuging). The fluorine and silica are separated from the resulting solution in the form of sodium fluosilicate by adding to the solution monosodium phosphate, bisodium phosphate or a mixture of these in such quantity that the atomic ratio of the sodium contained in the added phosphates in relation to the fluorine contained in the solution, is in the range from 1:1 to 2.5:1.

The precipitation and filtration temperature may vary within a very wide range, generally from 40° to 100° C, and preferably from 60° to 80° C. The arsenic contained in the resulting solution may be eliminated by following one of the known processes for this purpose, for example, by precipitation as sulphide by addition at room temperature of sodium sulphide in crystal form.

The filtrate thus obtained is concentrated, for example by vacuum evaporation in a flow of nitrogen to obtain a phosphoric acid solution with a $P_2O_5$ strength of from 45 to 55% by weight and preferably around 50% by weight.

When this concentration has been obtained the next step in the process is the elimination of the organic substances, normally by adding active carbon and heating the suspension obtained to a temperature in the range of 60° to 70° C for a period of from 0.5 to 1 hour.

The vanadium, chromium and iron are easily eliminated by addition to the solution of sodium hydroxide, an operation which is carried out for the preparation of sodium tripolyphosphate as described below. More specifically, after the addition of carbon powder and the related treatment, sodium hydroxide is added at 50% by weight in a first step up to a pH of 4, obtaining a solution of $NaH_2PO_4$, and in a second step up to a pH of between 6.7 and 6.8 obtaining a molar ratio $Na_2O/P_2O_5=1.66$. When the neutralization is completed the mass is heated to a temperature in the range of 85° to 95° C for a period of 0.5 to 1 hour. A precipitate is formed which is easily separated by filtration, the filtrate consisting of a phosphate solution at 50% by weight.

An oxidising treatment is then carried out on the phosphate solution with the object of eliminating the residual organic impurities, for example by means of nitric acid.

The phosphate solution is then dried by evaporation and the residue calcined at a temperature in the range 540°–560° C for a period of from 0.5 to 2 hours. The result is a tripolyphosphate in the form of a white powder with a vanadium content averaging about 13–16 ppm and an iron content between 50 and 100 ppm.

In tripolyphosphate produced commercially be previously known methods these values are about:

$V = 28$ ppm, $Fe = 270$ ppm.

With regard to the whiteness value determined by Color Eye, placing at 100 the value obtained for the product following the present invention, the value of the commercial product prepared by the previous techniques was 96.

In tripolyphosphate prepared from phosphorites in accordance with the process of the present invention, but using commercial sulphuric acid instead of sulphuric acid resulting from the hydrolysis stage of the sulphate process for producing titanium dioxide these values are $V = 40$–160 ppm, $Fe = 30$–280 ppm, whiteness value 65–92.

The results in this case are thus definitely inferior, and moreover the process is more complicated and more expensive because of the necessity of inserting in the purification treatment a reduction treatment with iron powder for the purpose of rendering the vanadium precipitable.

The invention will now be illustrated in greater detail in the following examples, which in each case do not constitute any limitation whatsoever.

In the examples the percentages are given by weight unless otherwise specified.

EXAMPLE 1

A pilot digester was charged with a suspension consisting of 100 Kg. of ilmenite and 195 Kg. of commercial sulphuric acid at 98%.

The ilmenite had been previously dried and ground to such a degree of fineness that 95% by weight passed through a sieve having 16,800 mesh per cm².

The ilmenite used possessed the following composition:

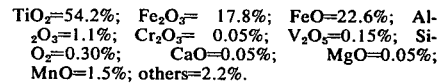

The ilmenite was held in suspension by means of air agitation; the reaction was primed by the rise in temperature caused by the dilution of the acid with 35Kg. of water; there followed an attack of 95.5% of the ore, giving place to a solid porous mass. This mass was dissolved with water to obtain a solution containing 120 g /litre of $TiO_2$ and was then subjected to reduction by treatment with iron scrap, operating at 65° C, until the iron in solution was completely in bivalent form and 1.5% of the titanium was in trivalent form.

The solution was strained with the object of eliminating the material not attacked by the acid and then the ferrous sulphate was crystallized by cooling to 15° C under vacuum and separated by centrifuging. The solution was then concentrated by heating to 60° C, at reduced pressure equal to 120 mm Hg column until the concentration of $TiO_2$ was about 225 g /l. The solution thus obtained was subjected to hydrolysis following the Blumenfeld method, pouring it after heating to 95° C, in 16 minutes, into water heated to 91° C; the quantity of water was 30% of that of the solution itself.

The resulting solution was boiled for 5 hours and then in order to complete the hydrolysis, water was added at 100° C, the volume of water added being 20% of the volume of the initial solution, finally the solution was boiled for a further two hours. The slurry when cooled to 55° C, was filtered and the cake washed with water and then treated to obtain pigmentary titanium dioxide.

The filtrate, upon addition of the water from the first washing of the cake, consists of a solution of sulphuric acid with a concentration of 20.5% by weight, and having the following composition:

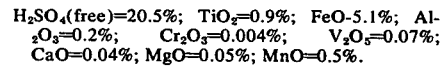

This solution was first concentrated by evaporation to a 55% sulphuric acid concentration, and then further concentrated to 68% by mixing with commercial sulphuric acid of 98% concentration. The 55% sulphuric acid solution had the following compositions:

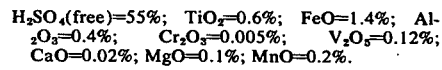

The 68% sulphuric acid solution had the following composition:

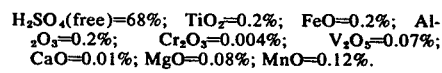

The 55% sulphuric acid solution was diluted with water to a concentration of the acid equal to 40% and was then used for the first stage of the phosphorite attack. The particle size of the phosphatic material was such that 93% passed through a sieve of 16,800 mesh per cm² and it also had the following composition:

$P_2O_5$=32.0%; CaO=49.50%; $Fe_2O_3$=0.65%; $Al_2O_3$=0.50%; $SiO_2$=2.80%; F=3.7%; V=0.01%; As=10 ppm.

The attack was carried out using the following quantities of material: phosphorite 250 parts by weight and sulphuric acid at 40% 566.5 parts by weight. It was reacted at 80° C for 6 hours. The slurry was then filtered, the cake washed and the washing waters added to the filtered phosphoric acid, obtaining a solution at 20% of $P_2O_5$. The second stage of the attack was carried out by mixing 800 parts by weight of the solution at 20% of $P_2O_5$, 300 parts by weight of phosphorite and 400 parts by weight of the sulphuric solution at 68% obtained by the method described above. This was reacted at 80° C for 6 hours and the slurry filtered to obtain a crude phosphoric acid solution with the following composition:

$P_2O_5$=22.9%; $H_2SO_4$(free)=4.9%; $SO_4^{--}$=6.7%; V=0.08%; F=1.8%; Fe=0.7%; Mg=0.05%; Al=0.3%; Ti=0.2%; Si=0.45%; Cr=40 ppm; organic substances = traces.

The crude phosphoric acid was purified by means of known processes, that is by sodium sulphide for the arsenic, phosphorites for the $H_2SO_4$ excess, silica and sodium hydroxide for the fluorine, active carbon for the organic substances and barium carbonate for the $SO_4^{--}$ ions. No treatment was required however, for the chemical conversion of the vanadium.

To the resulting solution was added sodium hydroxide at 50% up to a pH of 4 at 90° C and then further sodium hydroxide up to a pH of 6.8 continuing the heating at 90° C for 0.5 hours. The slurry so obtained was filtered and the filtrate treated with a quantity of nitric acid at 50% equal to 8 per litre of solution, for the purpose of destroying the organic substances that might still have been present.

After a last filtration the solution was evaporated until the dry phosphate was obtained and this latter was finally calcined for one hour at 550° C thus obtaining tripolyphosphate in white powder form. Chemical analysis was carried out on the tripolyphosphate thus obtained to determine the content in harmful impurities (Fe, Cr and V), and Color Eye analysis to determine the whiteness value.

A sample of commercial tripolyphosphate was also analysed in the same manner for the purpose of comparison.

In tripolyphosphate produced by the method described above were found:

Fe=58 ppm; V=13.5 ppm; Cr=traces.

In the sample of commercial tripolyphosphate were found:

Fe=270 ppm; V=28 ppm; Cr=traces.

In so far as the whiteness value was concerned, if the tripolyphosphate obtained by the method of the example described is assigned a value of 100 the commercial tripolyphosphate had a value of 96.

EXAMPLE 2 (comparison)

The phosphorite attack was repeated in the manner described in Example 1, but with the difference that commercial type sulphuric acid was used. Tripolyphosphate was then derived by following exactly the method of Example 1.

The product thus obtained was of decidedly yellow hue, and from a chemical analysis it was found to have a content of Fe=30 ppm, and V=160 ppm. Under Color Eye analysis the tripolyphosphate possessed a whiteness value equal to 65, with reference to the whiteness value of 100 of the tripolyphosphate prepared in Example 1.

EXAMPLE 3 (comparison)

The phosphorite attack was repeated and the sodium tripolyphosphate preparation carried out as in Example 2, but with the difference that in the purification of the crude phosphoric acid a treatment with iron powder was inserted, as in the normal technique, for the purpose of reducing the vanadium to trivalent, precipitable form, and thus obtaining a tripolyphosphate of greater purity than in Example 2. The iron treatment was carried out a number of times with increasing quantities of iron up to the stoichiometric value, operating in each case at 65° C for 2 hours.

The results obtained from an analysis of the characteristics of the sodium tripolyphosphate produced, are summarized in Table 1, where the iron used in the treatment is given as a percentage of the stoichiometric quantity required for the reduction of vanadium, the V and Fe values are given in ppm, and the colour values are given with reference to that of the tripolyphosphate produced by Example 1 being assigned a value of 100.

TABLE 1

| Iron used in the treatment (% of stoichiometric) | Sodium V(ppm) | Tripolyphosphate Fe (ppm) | analysis colour |
|---|---|---|---|
| 30 | 90 | 40 | 75 |
| 70 | 62 | 65 | 90 |
| 100 | 40 | 280 | 92 |

What is claimed is:

1. A process for the joint production of titanium dioxide and sodium tripolyphosphate from ores of titanium and phosphorous and from sulphuric acid comprising:
   a. contacting, at an elevated temperature, ilmenite or titanium bearing slags with concentrated sulphuric acid to form a solid product which is subsequently dissolved in water or weak acid to yield a solution containing titanium sulphates and iron sulphates;
   b. converting entirely said iron sulphates to their reduced, ferrous form by reducing the ferric iron present to ferrous iron, and clarifying the resulting solution;
   c. separating the ferrous sulphate in the form of ferrous sulphate heptahydrate;
   d. subjecting the remaining solution from which the ferrous sulphate heptahydrate has been separated to hydrolysis so that the titanium dioxide is precipitated in hydrated form, leaving an aqueous solution of sulphuric acid;
   e. converting said precipitated hydrated titanium dioxide to pigments of rutile or anatase;

f. concentrating said aqueous solution of sulphuric acid resulting from the separation of hydrated titanium dioxide to a concentration of between 40% and 70% by weight of free acid;

g. contacting the concentrated solution of sulphuric acid at an elevated temperature with phosphatic ores, the quantity of concentrated solution of sulphuric acid being in excess of the stoichiometric quantity necessary to liberate phosphoric acid from said ores;

h. separating the fluorine and silicon from the solution resulting from the acid attack of the phosphatic ores and purifying the solution from sulphate ions, free sulphuric acid, arsenic and organic substances present;

i. separating vanadium, chronium and iron by the addition of sodium hydroxide in an amount sufficient also to cause salification of the phosphoric acid; and j. converting sodium phosphates thus-produced to sodium tripolyphosphate.

2. The process of claim 1 wherein said attack of ilmenite or titanium-bearing slags is effected by means of commercial sulphuric acid having a concentration of about 98% by weight.

3. The process of claim 1 wherein the separation of the ferrous sulphate heptahydrate is effected by precipitation upon cooling the solution to a temperature between 10°–20° C.

4. The process of claim 1 wherein the aqueous solution of sulphuric acid remaining after the separation of hydrated titanium dioxide is subjected to a concentration to a content of between 50% and 55% by weight of the free acid.

5. The process of claim 1 wherein the vanadium, chromium and iron are precipitated from the solution of phosphoric acid containing 45–55% by weight $P_2O_5$ by the addition of aqueous sodium hydroxide at about 50% by weight concentration in such a way as to first adjust the pH value to 4 and subsequently to between 6.7 and 6.8.

6. The process of claim 1 wherein said sodium tripolyphosphate has a vanadium content averaging about 13 to 16 ppm.

7. The process of claim 1 wherein said sodium tripolyphosphate has an iron content between 50 and 100 ppm.

* * * * *